Oct. 23, 1928.
W. L. REINHARDT
1,688,399
STORAGE BATTERY PLATE AND METHOD OF PERMANIZING THE SAME
Original Filed Oct. 11, 1922
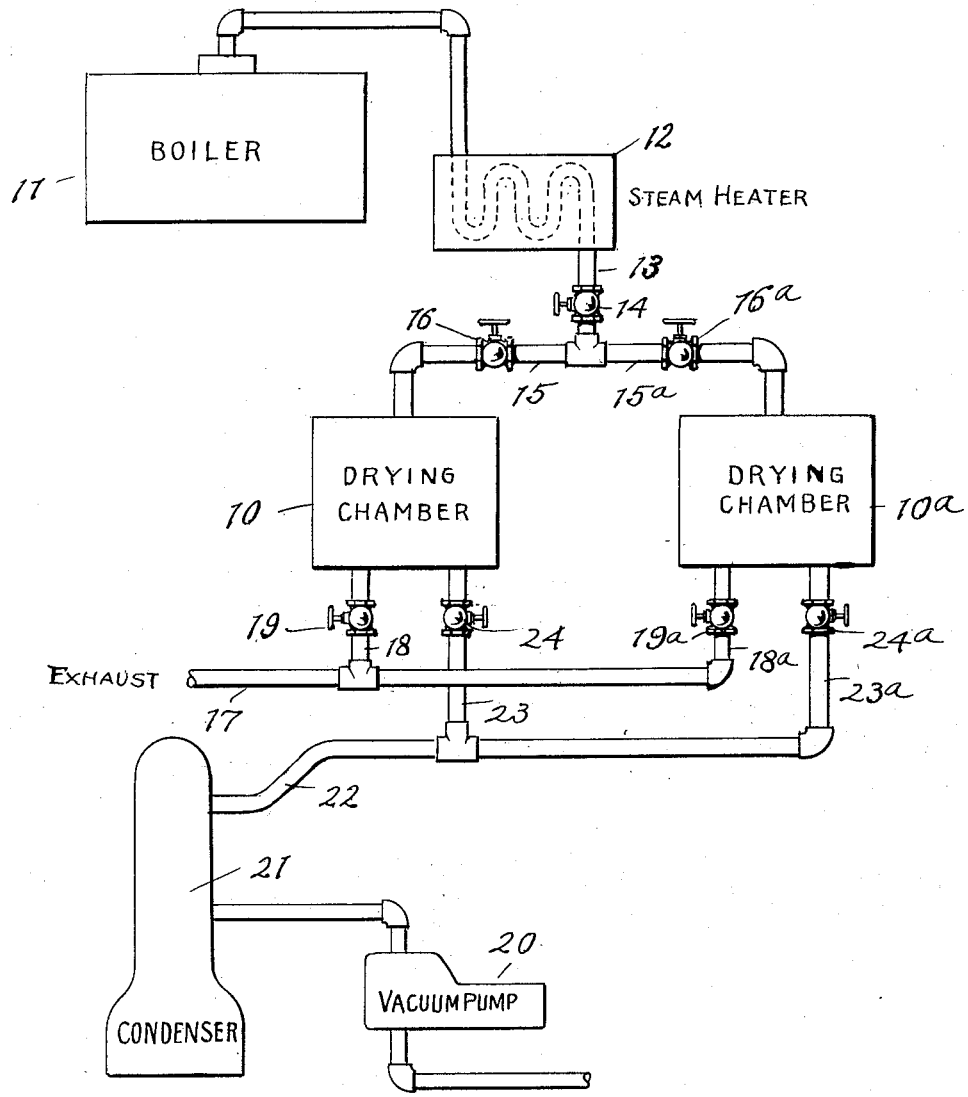
INVENTOR.
Willard L. Reinhardt
BY
Thurston Knox & Hudson
ATTORNEYS.

Patented Oct. 23, 1928.

1,688,399

UNITED STATES PATENT OFFICE.

WILLARD L. REINHARDT, OF EAST CLEVELAND, OHIO, ASSIGNOR TO WILLARD STORAGE BATTERY COMPANY, OF CLEVELAND, OHIO, A CORPORATION OF WEST VIRGINIA.

STORAGE-BATTERY PLATE AND METHOD OF PERMANIZING THE SAME.

Application filed October 11, 1922, Serial No. 593,905. Renewed March 9, 1928.

This invention relates to storage battery plates and a method of "permanizing" the same. It has to do particularly with charged negative plate. By permanizing is meant the removal of moisture from the formed plates without oxidation, and also preventing further oxidation during storage.

Negative storage battery plates are pasted with oxide of lead, and in the forming or charging process the oxide of lead is converted to sponge lead. It is very desirable that oxidation of the sponge lead be prevented after the forming process and until the battery containing such plates is filled with acid. This is particularly important inasmuch as it is customary at the present time for battery manufacturers to ship batteries in dry condition, or without the electrolyte. Unless the negative plates are dried without oxidation of the sponge lead, these plates will have little or no capacity until there is a reconversion to sponge lead.

One of the objects of the present invention is the prevention of oxidation of negative battery plates during storage of the same, that is, after the lead oxide with which the plates are pasted has been converted to sponge lead in the forming operation.

The invention may be briefly summarized as consisting in the novel storage battery plate and steps of the improved method hereinafter described and set forth in the appended claims.

In the accompanying sheet of drawings I have shown diagrammatically, one form of apparatus which may be utilized in carrying out the process involving my invention.

In accordance with my improved process, the formed negative plates are subjected to a highly heated inert gas. This is preferably done by placing the plates in a chamber and circulating the heated inert gas through the chamber so that the gas may circulate around and through the plates. While various inert gases may be employed, I prefer to use superheated steam of from 5 to 50 pounds pressure and from 30 to 150° superheat. This treatment is continued until the plates have reached a temperature approximating that of the superheated steam, which is considerably above the boiling or vaporizing point of the moisture in the plates.

When the plates have reached the proper temperature the superheated steam is shut off from the chamber, the pressure is released, and the chamber is evacuated, preferably by a suction pump, which withdraws all vapors from the chamber. Preferably the chamber is evacuated to a vacuum of 25 to 28 inches of mercury.

By the combined steps of first subjecting the plates to the action of a highly heated inert gas such as superheated steam, and then evacuating the chamber, as explained above, the plates are perfectly dried without oxidation, and the entire process is performed quickly and inexpensively, particularly as the moisture in the plates is thoroughly vaporized in a short space of time by the heated inert gas, and is quickly carried away from the plates by the evacuating process, and for the further reason that a large number of plates can be treated in this manner at the same time.

The plates can be treated in this manner when removed from the regular forming solution, either with or without first washing the plates free of the forming solution.

As a modification of the above process, or as an addition to the two main steps described above, the plates may, if desired, prior to being subjected to the heated inert gas, be treated with a solution, which when dried by the heated inert gas, as explained above, will leave on the plates a thin coating to insure permanency, which coating is impervious to moisture, and is soluble in the regular battery solution. The plates may be immersed in the coating solution either with or without first washing the plates free of the forming solution. The process of drying the plates without oxidation by first subjecting the plates in a chamber to the heated inert gas and then evacuating the chamber, is the same, whether or not the plates are first treated with the coating solution, for when the coating solution is used, all the moisture in and on the plates is vaporized and removed from the plates by the evacuating process, leaving the plates dry but provided with the thin protective coating.

As a further modification the protective coating may be placed on the plates after they have been dried. This can be done without oxidation by dissolving the material for the protective coating in alcohol, benzine, naphtha, or other suitable solvent which is quickly volatilized, and by dipping the dried plates in the solution thus formed. When the plates are dipped in a solution of this kind, they will quickly dry without oxidation, and the plates will be left with the thin protective coating.

No single specific material for thus coating the plates is essential. Many different materials may be employed for the purpose, amongst which may be mentioned animal glue, vegetable glue and soluble cellulose.

My invention is not limited to any particular form of apparatus, and may therefore be practiced in different ways, but in the accompanying sheet of drawings is shown in simplified or conventional manner, apparatus which may be used effectively.

In practice I generally employ two drying chambers, which I have illustrated at 10 and 10$^a$, in order that while one chamber is being relieved of dried plates and reloaded, the other may be used for drying the plates contained in it. The steam is generated in any suitable boiler 11, and before it is supplied to the chambers 10 and 10$^a$, its temperature is raised by a suitable heater 12. In the steam line 13 leading from the heater there is preferably provided a valve 14, and from the pipe or line 13, branches 15 and 15$^a$ are extended to the two drying chambers 10 and 10$^a$, these branches having valves 16 and 16$^a$.

During the drying operation the steam is conducted away from the chamber by an exhaust pipe 17 connected to the chambers by pipe sections or branches 18 and 18$^a$ which are provided with valves 19 and 19$^a$.

The vacuum pump referred to in the above description, is shown at 20, this pump being preferably connected to a condenser 21, which is connected to the driers by a pipe 22 and branches 23 and 23$^a$, the branches having valves 24 and 24$^a$.

Assuming that the plates are first placed in chamber 10, the valve 14 and the exhaust valve 19 in the exhaust pipe branch leading from chamber 10 are opened. Valve 16 in the steam supply pipe leading to chamber 10 is then slowly opened so as to permit the steam to pass around the plates in chamber 10 and out through exhaust valve 19. The steam must be admitted to the chamber gradually so that the force of the steam will not bend the plates or force them from the racks in which they are suspended.

After the steam is passed through chamber 10 for a length of time sufficient to produce the desired drying action, the valve 16 is slowly closed and at the same time the valve 16$^a$ is slowly opened, and when the pressure in chamber 10 has reached atmospheric pressure, the pressure in chamber 10$^a$ will be equal to the pressure in the main steam line. Exhaust valve 19 is now closed, and valve 24 is opened; the vacuum pump 20 is then started, and the drying chamber 10 is evacuated. During the period of evacuation in chamber 10, steam will be flowing through drying chamber 10$^a$, and when sufficient steam has passed through this chamber the same operations will be carried out as with chamber 10.

After a drying chamber has been evacuated air is admitted to it, the door is opened, and the plates removed.

Though, of course, the use of two drying chambers is not necessary to the successful practicing of my improved method, nevertheless, by employing two chambers, loss of time is avoided, for while the plates are being dried in one chamber, the other is being evacuated preparatory to the removal of the dried plates and the charging with another batch of plates to be dried.

Having described my invention, I claim:

1. The method of permanizing storage battery plates, which comprises treating the plates with a solution which when dry will leave a moisture excluding coating on the plates, and then subjecting the plates to the heating action of a highly heated inert gas.

2. The method of permanizing storage battery plates, which comprises treating the plates with a solution which when dry will leave a moisture excluding coating on the plates, subjecting the plates to the heating action of a highly heated inert gas, and withdrawing the vaporized moisture from the plates.

3. The method of permanizing negative storage battery plates, which comprises treating the plates with a solution which when dry will leave a coating on the plates, subjecting the plates thus treated to the action of a highly heated inert gas in a chamber, and evacuating the chamber.

4. The method of permanizing storage battery plates, which without reference to the order of procedure comprises removing the moisture from the plates without oxidation, and preventing the entrance of moisture by the application of a protective coating impervious to moisture.

5. The method of permanizing charged, negative storage battery plates which comprises drying the plates without oxidation and preventing the entrance of moisture by the provision of a protective coating impervious to moisture.

6. A charged, negative storage battery plate having its active material dried and coated with a substance to prevent the entrance of moisture.

7. A charged, negative storage battery plate comprising active material in the form of sponge lead dried and coated with a substance to prevent the entrance of moisture.

8. The method of permanizing charged, negative storage battery plates which, without reference to the order of procedure, comprises removing the moisture from the plates and applying to the plates a protective coating impervious to moisture.

In testimony whereof, I hereunto affix my signature.

WILLARD L. REINHARDT.